United States Patent [19]

Akaiwa

[11] Patent Number: 4,661,970

[45] Date of Patent: Apr. 28, 1987

[54] CORDLESS TELEPHONE SYSTEM

[75] Inventor: Yoshihiko Akaiwa, Tokyo, Japan

[73] Assignee: NEC Corporation, Japan

[21] Appl. No.: 868,140

[22] Filed: May 28, 1986

[30] Foreign Application Priority Data

May 30, 1985 [JP] Japan ............................. 60-117137

[51] Int. Cl.$^4$ ............................................. H04Q 7/04
[52] U.S. Cl. ........................................ 379/61; 379/63; 379/56
[58] Field of Search ................. 179/2 E, 2 EA, 2 EB, 179/2 EC

[56] References Cited

U.S. PATENT DOCUMENTS

| 3,014,326 | 10/1971 | Cameron | 179/2 A |
|---|---|---|---|
| 4,012,596 | 3/1977 | West, Jr. et al. | 179/2 EA |
| 4,087,636 | 5/1978 | Akiyama et al. | 179/2 EA |
| 4,291,197 | 9/1981 | Yonaga | 179/2 EA |
| 4,400,585 | 8/1983 | Kaman et al. | 179/2 EB |
| 4,424,514 | 1/1984 | Fennell et al. | 340/825.52 |

Primary Examiner—Robert G. Lev
Attorney, Agent, or Firm—Laff, Whitesel, Conte & Saret

[57] ABSTRACT

A cordless telephone system includes a plurality of radiophones, each having a first transmitter and a first receiver of different transmission and reception frequencies; and a radio station, wired to a telephone line. The radio station comprises a second receiver and a second transmitter, each having the same reception and transmission frequencies as those of the radiophones; switching means for connecting an input terminal of the second transmitter and an output terminal of the second receiver to the telephone line, or for connecting the input terminal of the second transmitter and the output terminal of the second receiver; and control means for receiving a control signal from the second receiver and supplying a control signal to the switching means. Half duplex communication can be performed between the radiophones.

3 Claims, 4 Drawing Figures

CORDLESS TELEPHONE SYSTEM

BACKGROUND OF THE INVENTION

The present invention relates to a cordless telephone system.

U.S. Pat. No. 4,291,197 discloses an example of a cordless telephone system. The system comprises a radiophone including a radio receiver of a reception frequency f1 and a radio transmitter of a transmission frequency f2, and a radio station wired to a communication line. The radio station has a radio transmitter/receiver of a transmission frequency f1 and a reception frequency f2. The radio station and the radiophone perform communication in a full duplex manner.

In a conventional cordless telephone system, basically only a single radiophone is connected to a single telephone line.

When a plurality of radiophones are used, it is convenient if communication can be performed between radiophones. However, since the respective radiophones have the same transmission frequency f2 and reception frequency f1, they cannot communicate with each other.

SUMMARY OF THE INVENTION

It is an object of the present invention to provide a cordless telephone system which allows communication not only between a radiophone and a telephone line, but also between radiophones.

According to the present invention, there is provided a cordless telephone system including a plurality of radiophones, each having a first transmitter and a first receiver of different transmission and reception frequencies; and a radio station, wired to a telephone line, the radio station comprising a second receiver and a second transmitter having reception and transmission frequencies which are respectively same as the transmission and reception frequencies of the radiophones; switching means for connecting an input terminal of the second transmitter and an output terminal of the second receiver to the telephone line, or for connecting the input terminal of the second transmitter and the output terminal of the second receiver in accordance with a switching control signal; and control means for receiving a control signal from the radiophones through the second receiver and supplying the switching control signal to the switching means, wherein half duplex communication can be performed between the radiophones.

DETAILED DESCRIPTION OF PREFERRED EMBODIMENT

Figure 1:
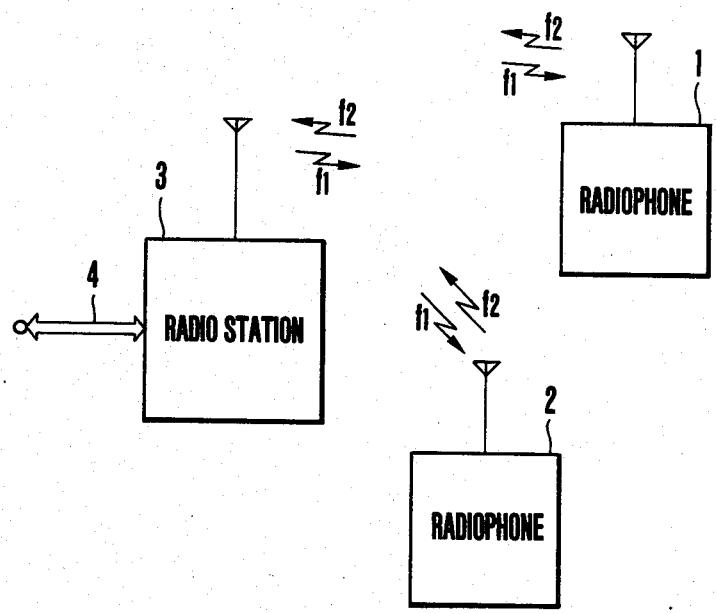
FIG. 1 is a block diagram showing an overall configuration of a cordless telephone system according to the present invention.

FIG. 1 shows a cordless telephone system according to the present invention which has two radiophones. In FIG. 1, reference numerals 1 and 2 denote the same type of radiophone, each having transmission and reception frequencies f2 and f1. A radio station 3 has a radio transmitter/receiver of a transmission and reception frequencies f1 and f2, and is connected to a telephone line 4. With this arrangement, the radiophones 1 and 2 are connected to the telephone line 4 through the radio station 3, and communicate with each other through the radio station 3.

Figure 2:
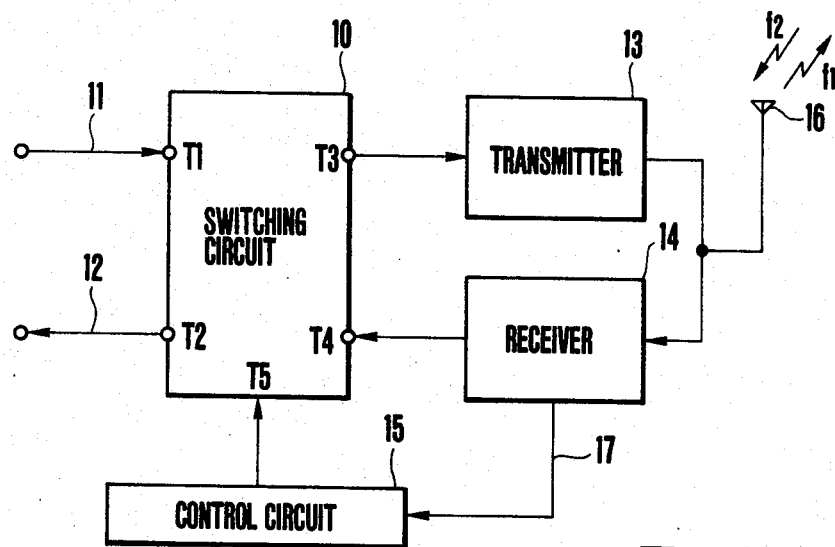
FIG. 2 is a block diagram of an example of a radio station shown in FIG. 1.

FIG. 2 is a block diagram of an example of the radio station 3 shown in FIG. 1. In FIG. 2, reference numeral 10 denotes a switching circuit having input terminals T1 and T4, output terminals T2 and T3, and a control terminal T5. In accordance with a switching control signal supplied to the control terminal T5, the switching circuit 10 connects the terminals T1 and T3, T2 and T4, or T3 and T4. The input and output terminals T1 and T2 are wired to telephone lines 11 and 12, respectively. The telephone line 11 transmits an input signal to the switching circuit 10, and the telephone line 12 transmits an output signal therefrom. The output terminal T3 of the switching circuit 10 is connected to an input terminal of a transmitter 13 having a transmission frequency f1, and the input terminal T4 thereof is connected to an input terminal of a receiver 14 having a reception frequency f2. The control terminal T5 of the switching circuit 10 is connected to the output terminal of a control circuit 15. The output terminal of the transmitter 13 and an output terminal of the receiver 14 are connected to a common antenna 16. The receiver 14 is connected to the input terminal of the control circuit 15 through a control signal line 17. The control circuit 15 is preferably constituted with a control section which performs ordinary radio channel control and comprises a microprocessor.

Figure 3:
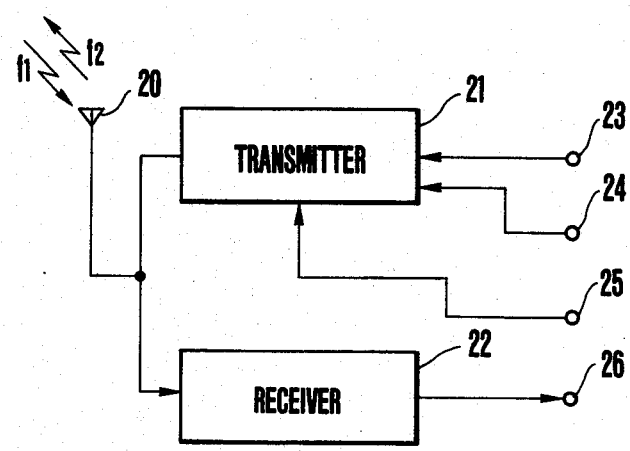
FIG. 3 is a block diagram of an example of radiophones shown in FIG. 1.

FIG. 3 shows an example of the radiophones 1 and 2 shown in FIG. 1. In FIG. 3, an antenna 20 is connected to the output terminal of a transmitter 21 with a transmission frequency f2 and the input terminal of a receiver 22 of a reception frequency f1. The transmitter 21 has three input terminals 23, 24, and 25. The input terminal 23 receives an audio signal. The input terminal 24 receives a ringing signal from a push button (not shown) used when one radiophone calls another. The input terminal 25 receives a signal from a press-to-talk switch (not shown). An output terminal 26 of the receiver 22 is connected to a telephone receiver (not shown).

Figure 4:
FIG. 4 shows a format of a control signal.

FIG. 4 shows a format of a control signal transmitted between the radiophone and the radio station, and between radiophones. More specifically, a preamble signal P for establishing synchronization between the transmitter and the receiver, a start signal ST representing the start of a data signal, and thereafter, a data signal D are transmitted. In the cordless telephone system, a control signal which controls various communication states, such as establishment of a radio channel, and start and completion of a communication, is transmitted with the format shown in FIG. 4. A circuit for processing the control signal is included in the transmitter 13 and the receiver 14 of the radio station 3, and in the transmitter 21 and the receiver 22 of the radiophones 1 and 2.

An operation of the cordless telephone system shown in FIG. 1 which uses the radio station shown in FIG. 2 and the radiophone shown in FIG. 3 will now be described.

Normally, the terminals T1 and T3, and T2 and T4 are connected in the switching circuit 10 so that communication can be made between one radiophone and the telephone lines 11 and 12 in the same manner as in a conventional cordless telephone system. More specifically, a signal, such as an audio signal or a ringing signal from the telephone line 11, is supplied to the transmitter 13, is transmitted from the antenna 16 at the frequency f1, is received by the reception antenna 20 of the radiophone shown in FIG. 3, is supplied to the receiver 22, and appears at the output terminal 26. A transmission signal supplied to the input terminal 23 of the radiophone is transmitted onto the telephone line 12 through the transmitter 21, the antenna 20, the antenna 16 of the radio station 3, the receiver 14, and the terminals T4 and T2.

An operation of the cordless telephone system when communication is to be made between radiophones, i.e., between the radiophone 1 and the radiophone 2 will be described.

When a push button (not shown) of the radiophone 1 shown in FIG. 1 is depressed, a ringing signal is supplied to the input terminal 24 of the transmitter 21. The ringing signal has the format shown in FIG. 4. The transmitter 21 then transmits the ringing signal at the frequency f2 through the antenna 20. The ringing signal is received by the receiver 14 through the antenna 16 of the radio station 3 (shown in FIG. 2). The receiver 14 decodes the ringing signal and sends the decoded signal to the control circuit 15 through the control signal line 17. The control circuit 15 sends a switching control signal to the control terminal T5 of the switching circuit 10 in response to the signal from the receiver 14. The switching circuit 10 connects the terminals T3 and T4 in response to the control signal applied to its control terminal T5. A communication line between the radiophones 1 and 2 is thus established. Therefore, the transmitted audio signal supplied from the input terminal 23 of the radiophone 1 is sent to the radiophone 2 through the transmitter 21, the antenna 20, the antenna 16 of the radio station 3, the receiver 14, the terminals T4 and T3, the transmitter 13, the antenna 16, the antenna 20 of the radiophone 2, and the receiver 22 thereof. Communication from the radiophone 2 to the radiophone 1 is made in the same manner. Since the transmission and reception frequencies f2 and f1 of the two radiophones 1 and 2 are the same, communication cannot be made at once, but in a half duplex manner. A signal from the press-to-talk switch (not shown) for causing the half duplex communication is supplied to the input terminals 25 of the radiophones 1 and 2, thereby performing on/off control of signal transmission.

When the mutual communication between the radiophones 1 and 2 ends, an end signal is transmitted. Upon detection of the end signal, the receiver 14 of the radio station 3 sends a signal representing the end of communication to the control circuit 15. The control circuit 15 sends a control signal to the control terminal T5 of the switching circuit 10 in response to the communication end signal. The switching circuit 10 then restores the connection between its terminals to a normal state (terminals T1 and T3, and T2 and T4 are connected) in response to the switching control signal.

It is desirable that a timer is provided in the control circuit 15. In this case, even if the user forgets to send an end signal, the switching circuit 10 is restored to the normal state automatically by the timer, a predetermined period of time after it receives a ringing signal.

The control circuit 15 for controlling switching changes the switching state after it detects a predetermined signal. Therefore, the control circuit is not different from that of a conventional system.

In the embodiment of the present invention shown in FIG. 2, the telephone line is provided with a four-wire system wherein the input and output lines 11 and 12 operate independently. However, when a hybrid circuit, as in a conventional telephone line, is added, the telephone line can be provided with a two-wire system.

A function can be added which forcibly interrupts communication between radiophones when a ringing signal is received from the telephone line during half duplex communication. This function can be easily obtained by restoring the switching circuit 10 to a normal connection state to the telephone line upon detection of a ringing signal therefrom.

According to the present invention, a function can be added which temporarily holds communication with the telephone line, allows communication between radiophones, and then reconnects the telephone line. A method for holding the telephone line is conventionally known and a detailed description thereof will be omitted here. To briefly state it in association with the present invention, the switching circuit 10 can be switched to allow communication between the radiophones by detecting a signal from a holding button, thereby holding communication with the telephone line.

As apparent from the above description, according to the present invention, communication between radiophones can be easily realized by adding a simple circuit to a conventional cordless telephone system. A radio circuit need not be modified or the radio frequency need not be increased, resulting in great advantages.

What is claimed is:

1. A cordless telephone system including a plurality of radiophones, each having a first transmitter and a first receiver of different transmission and reception frequencies; and a radio station, wired to a telephone line,
    said radio station comprising:
    a second receiver and a second transmitter, having reception and transmission frequencies which are respectively same as the transmission and reception frequencies of said radiophones:
    switching means for connecting an input terminal of said second transmitter and an output terminal of said second receiver to said telephone line, or for connecting said input terminal of said second transmitter and said output terminal of said second receiver in accordance with a switching control signal; and
    control means for receiving a control signal from said radiophones through said second receiver and supplying the switching control signal to said switching means, wherein half duplex communication can be performed between said radiophones.

2. A system according to claim 1, wherein said switching means of said radio station normally operates to connect said input terminal of said second transmitter and said output terminal of said second receiver to said telephone line; said switching means switches to connect said input terminal of said second transmitter to said output terminal of said second receiver when a ringing signal supplied to said first transmitter is transmitted to said radio station in order to allow communication of said radiophone to another radiophone and a switching signal is supplied to said switching means through said second receiver and said control means; and said switching means restores a normal connection in response to a control signal from said control means when said second receiver receives an end signal.

3. A system according to claim 1, wherein said radiophones transmit an audio signal by a press-to-talk signal.

* * * * *